Aug. 31, 1926.

A. D. TRENOR 1,598,107

HELM LIMITING DEVICE

Original Filed March 14, 1918    2 Sheets-Sheet 1

INVENTOR
Albert D. Trenor
BY A. J. Gardner
HIS ATTORNEY

Aug. 31, 1926. 1,598,107
A. D. TRENOR
HELM LIMITING DEVICE
Original Filed March 14, 1918 2 Sheets-Sheet 2

INVENTOR
Albert D. Trenor
BY
A. J. Gardner.
HIS ATTORNEY

Patented Aug. 31, 1926.

1,598,107

UNITED STATES PATENT OFFICE.

ALBERT D. TRENOR, OF NEW YORK, N. Y., ASSIGNOR TO JOHN HAYS HAMMOND, JR., OF GLOUCESTER, MASSACHUSETTS.

HELM-LIMITING DEVICE.

Original application filed March 14, 1918, Serial No. 222,359. Divided and this application filed January 31, 1922. Serial No. 532,969.

Some of the objects of the present invention are to provide a means for maintaining a moving body upon a certain predetermined course whereby any variation or deviation of said body from the prescribed course is automatically and promptly corrected; to provide a steering mechanism adapted to move about a fixed axis through an angle proportioned in a definite ratio to any angle of deviation of the moving body from a predetermined course; to provide means to automatically arrest the movement of the steering mechanism after a certain angle of movement caused by the deviation of the moving body from its course; to provide means to vary the ratio of movement of the steering mechanism to the deviation of the moving body according to requirements.

Figure 1:
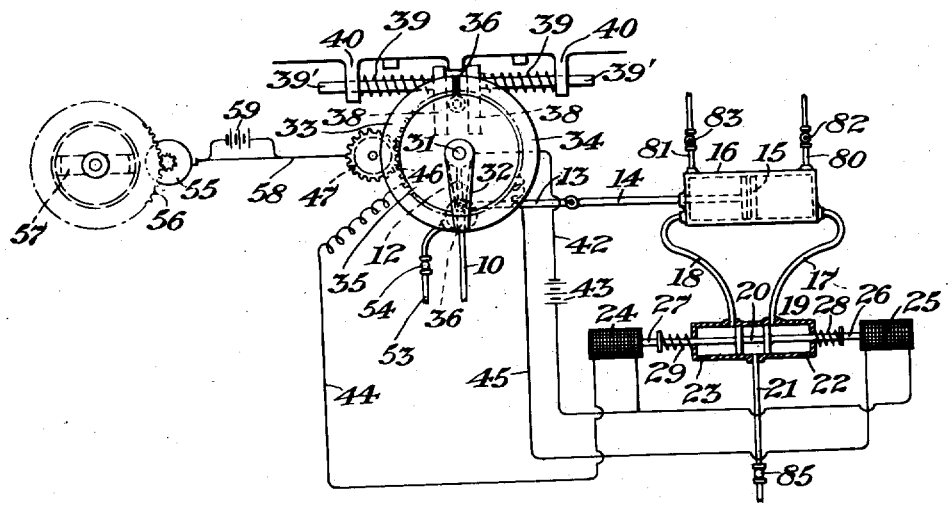
Figure 2:
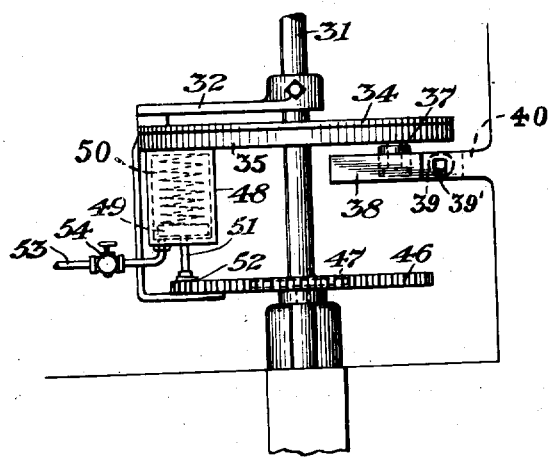
Figure 3:
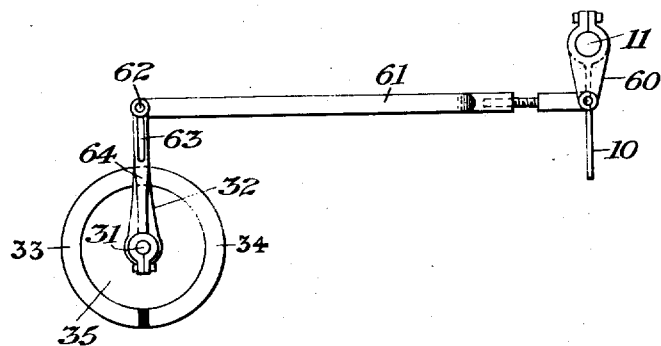
Figure 4:
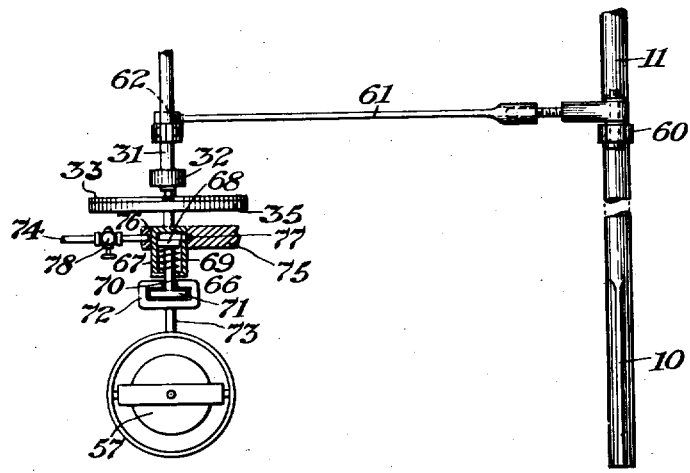

In the accompanying drawings Fig. 1 is a diagrammatic representation of a helm limiting device embodying the present invention; and Fig. 2 is a detail in elevation of the control mechanism; Fig. 3 is a modification in plan of the motion transmitting means from the steering mechanism; and Fig. 4 is a side elevation of the parts shown in Fig. 3.

This application is a division of my copending application, Serial No. 222,359, filed March 14, 1918, renewed April 15, 1912, Serial No. 461,676, Patent No. 1,405,078, Patented Jan. 31, 1922.

Referring to the drawings, one form of the invention comprises a rudder 10 which is rigidly secured to a rudder post 11 which when in operation is carried by a movable body and arranged to be rotated with respect thereto about an axis coincident with the longitudinal axis of the post and fixed with respect to the movable body to oscillate the rudder 10 to control the movement of the movable body. The rubber 10 and rudder post 11 may be the usual rudder and rudder post of a torpedo, a boat or other marine vessel or might form parts of an aircraft or other movable body.

Rigidly secured to the rudder post 11 is a lever arm 12 which is pivotally connected by means of a link 13 to one end of a piston rod 14, the other end of which is secured to a piston 15 which is arranged to be reciprocated in a fixed cylinder 16 under the action of compressed air or the like admitted alternately to or exhausted from opposite ends of the cylinder 16 through corresponding pipes 17 and 18 which are controlled by means of a cylindrical slide valve 19. This valve is of well known construction and includes a movable double valve element 20 which opens and closes communication between a main pressure fluid supply pipe 21 and the pipes 17 and 18 and between these latter and corresponding exhaust ports 22 and 23. The movable valve element 20 is operated and the direction of its movement selectively controlled by solenoids 24 and 25 having cores 26 and 27 respectively forming extensions of the movable valve element 20. Suitable springs 28 and 29 serve to return and maintain the valve 20 in neutral position when the solenoids are de-energized.

The mechanism by which the solenoids are selectively energized to control the rudder 10 according to requirements consists, in one embodiment of the invention, of a shaft 31 which in the form here described forms an extension of the rudder shaft 11, though this is not always the case. This shaft 31 carries a contact arm 32 fixed to move with said shaft and to slidably engage alternately two arcuate contact segments 33 and 34 mounted upon and rotatable with, but insulated from, a plate 35 which is loosely mounted upon the shaft 31 to rotate freely with respect thereto. The ends of the two segments are suitably spaced apart by two insulation segments 36, so that in normal position the contact arm 32 rests on such insulation and the control circuits to the solenoids are broken. In order to return to and also to maintain the plate 35 in this normal position a roller 37 or the like is mounted upon the plate 35 to rotate freely with respect thereto about an axis fixed with respect to the plate and between two followers 38 which are pressed towards each other respectively by two opposed springs 39, which respectively surround two aligned shafts 39' 39' rigidly secured to the two followers 38, 38, and arranged to reciprocate respectively in two fixed bearings 40, 40. The circuits controlled by the segments and arm have a common return conductor 42 connecting the solenoids 24 and 25 with the arm 32 through a battery 43 and two separate conductors 44 and 45 connecting the respective segments 33 and 34 with the respective solenoids 24 and 25.

For automatically rotating the plate 35, whereby one or the other circuit is closed, a suitable clutch mechanism is provided for frictionally locking the plate 35 to a gear 46 loosely mounted upon the shaft 31 and rotated with respect thereto according to requirements by means of an electric motion repeater 47, the control of which will be later described. In the form shown this clutch consists of a cylinder 48 secured to the plate 35 and having a piston 49 therein which is normally pressed outwardly by a spring 50. The piston 49 actuates a piston rod 51 which carries a clutch disc 52 which is normally held in frictional contact with the face of the gear 46 whereby movement of the latter is transmitted to the plate and both turn in the required manner about the shaft 31 and relative to the arm 32. Should it be desired to release the clutch, a pipe 53 is provided and adapted to convey pressure fluid to the cylinder 48, with which it communicates on the side of the piston 49 opposite to the spring 48. A valve 54 in the pipe 53 controls the supply of fluid at will.

The electric repeater 47 which actuates the gear 46 is actuated by an electrical transmitter 55 which is actuated by a gear 56 which is rigidly secured to a normally vertical shaft which is arranged to rotate with respect to the vessel or other movable body about an axis fixed with respect to the vessel or other movable body and coincident with the longitudinal axis of the shaft, and to be held against rotation in space about that axis by means of a gyroscope 57 or other suitable stabilizing means. The repeater 47 is connected to the transmitter 55 through a four wire cable 58 including a battery 59. In the present construction the speed ratio is greater than unity and such that the gear 46 rotates or turns at an angular rate of rotation greater than the angular rate of rotation of the gyro-gear 56. In the form shown by way of example the gear ratio is 2½ to 1 and consequently a deviation of the moving body five degrees from its true course will result in the gear 46 being turned in the opposite direction through an angle of twelve and one half degrees. This latter angle must be turned by the arm 32 before it returns to normal position upon the insulating block and hence the rudder movement is limited to a definite predetermined movement.

The operation of the form of this invention shown in Figures 1 and 2 just described is as follows: Assuming that the moving body, which is being steered on a predetermined course, should deviate from that course, for example five degrees to the right. The first result of this action is a relative movement between the moving body and the gear 56 of the gyro-compass, since this latter is fixed in space and consequently mov with respect to the body five degrees to t left or counter-clockwise. This moveme is transmitted to the gear 46, which, due the speed ratio and gearing, is moved twel and one half degrees to the right or cloc wise, thus correspondingly turning the co tact plate 35 relative to the arm 32 ar bringing the latter into contact with the se ment 34. The electric circuit controlled b the contact arm 32 and segment 34 is th closed, and the solenoid 25 energize whereupon the core 26 is shifted so that t slide valve 20 opens the pipe 17 to the su ply of pressure fluid from pipe 21. This a mits pressure to the motor cylinder 16 an causes the piston 15 to move to the left (Fi 1) thereby throwing the rudder in the d rection required to return the body to i prescribed course and correct its deviatio In addition to moving the rudder, t turning of the post 11 also turns the sha 31 which carries the contact arm 32, so th as the angle of the rudder is increasing t angle of the arm 32 relative to its normal p sition upon the insulation is decreasing. I consequence, when the rudder has swun through twelve and one half degrees the co tact arm 32 has reached the insulation an the circuit through the solenoid 25 is broke with the result that the solenoid is de-ene gized, its core returned by the spring actio and the pressure fluid cut off from the moto The pipe 17 consequently exhausts by wa of port 22 and the rudder is stopped in position to bring the moving body back t its predetermined course. As the bod swings to the left or counter-clockwise ur der the action of the rudder in its new pc sition, the plate 35 will be turned in a coun ter-clockwise direction with respect to th moving body under the action of the gyrc compass 57 and the arm 32 will make con tact with the segment 33, thus energizin the solenoid 24 and causing the rudder 1 to be turned in a counter-clockwise direc tion until the arm 32 is again on the insula tion segment 36, when the movement of th rudder will be stopped.

It is, therefore, evident that the rudde 10 will be displaced from its central positio an amount proportional to the deviation o the moving object from the predetermine course, and in a direction to bring the bod back to the predetermined course. The pro portion, in the preferred form, gives a move ment of the rudder two and one half time that of the amount of deviation of the body but it should be understood that this rati of movement may be varied as required o necessary.

In Figures 3 and 4, another embodimen of this invention is disclosed, wherein th control shaft 31 is separated from the rud er post 11, though connected thereto by suitable means for proportioning the throw of the rudder relative to the deviation of the moving body from its course. This mechanism comprises an arm 60 clamped to the post 11 for movement therewith, and having its free end pivoted to an adjustable rod 61 which carries a movable pivot 62 adapted to be clamped in any desired fixed position in a slot 63 of a lever 64. This latter operates the shaft 31 whereby the contact arm 32 is returned to normal position, which operation fixes the limit of angular deviation of the rudder as will be understood. The interposition of the connecting means between the post 11 and shaft 31 makes it unnecessary to employ a repeater between the gyro-compass 57 and the plate 5, and consequently these devices are directly coupled through the medium of a releasable clutch 66 comprising a cylinder 67 having a piston 68 arranged therein for reciprocatory movement and normally pressed in one direction by a spring 69. A piston rod 70 has one end secured to the piston 68 and its opposite end is secured to a clutch disc 71 which is encircled by and arranged to cooperate with a hollow clutch member 72 rigidly secured to the gyroscope stem 73. A pipe 74 passes into the fixed bracket support 75 and communicates with a groove 76 in the support, which groove 76 communicates through a port 77 with the interior of the cylinder 67 so that when the valve 78 in pipe 74 is open, pressure fluid is admitted to the opposite side of piston 68 from the spring 69, whereby the latter is overcome and the clutch in consequence is disconnected.

The operation of this form of the invention is in all material respects similar to that described in connection with the construction of Figures 1 and 2, assuming as before that the moving body should deviate from the predetermined course—say 5 degrees to the right. The first result of this rotation is a relative movement between the moving body and the gyro-compass 57, since this latter is fixed in space and consequently moves with respect to the moving body five degrees to the left, or counter-clockwise. This causes the plate 35 to move in a similar manner with respect to the moving body, and therefore causes the contact segment 34 to move under the brush 32, which energizes the solenoid 25, which moves the rudder 10 in a clockwise direction, as previously described, to return the moving body to the predetermined course. It therefore follows that the rudder 10 will be moving through an angle which is proportional to the angle through which the moving body has turned, and in a direction which will tend to return the moving body to its predetermined course.

In case it is desired to operate the rudder operating means by a control separate from the automatic means shown in Fig. 1, the valve 54 is opened to admit pressure fluid to the cylinder 48 to overcome the spring pressure and move the piston 48 in a direction to release the friction disc 52 from engagement with the gear 46. This renders this portion of the mechanism inoperative and control of the rudder shifting piston 15 is had by way of the pressure fluid pipes 80 and 81 after the valves 82 and 83 have been opened and the valve 85 closed. Any suitable control may be employed with the pipes 80 and 81 to control the movement of the body at will. When, however, the automatic helm limiting means is in use the valves 82, 83 and 54 are closed and the valve 85 opened as will be understood.

In case it is desired to operate the rudder operating means by a control separate from the automatic means shown in Fig. 4, the valve 78 is opened to admit pressure fluid to the cylinder 67 to overcome the spring pressure and move the piston 68 in a direction to release the friction disc 71 from engagement with the hollow clutch member 72. This renders this portion of the mechanism inoperative and control of the rudder shifting piston 15 is had by way of the pressure fluid pipes 80 and 81 after the valves 82 and 83 have been opened and the valve 85 closed. Any suitable control may be employed with the pipes 80 and 81 to control the movement of the body at will. When, however, the automatic helm limiting means is in use the valves 82, 83 and 78 are closed and the valve 85 opened as will be understood.

Having thus described my invention, what I claim and desire to secure by Letters Patent is:—

1. In a steering mechanism for a movable body, a rudder operatively mounted thereon, and rudder controlling means operated by the deviation of said body from its course for controlling said rudder, including means for adjustably regulating the rudder throw relatively to the deviation of the body.

2. In a steering mechanism for a movable body, a rudder operatively mounted thereon, and rudder controlling means operated by the deviation of said body from its course for controlling said rudder, including adjustable means for varying the rate of angular rudder movement relatively to the deviation of said body.

3. In a steering mechanism for a movable body, a rudder, means including a pair of contact members one including a movable segmental contact and insulation between the segments of said contact, and the other including a contact arm cooperating with said segmental contact to control the motion of the rudder, a stabilizer for maintaining one of said members fixed in space, and means, adjustable at will, operatively interconnecting the other of said members with the rudder for regulating the rudder throw relatively to deviation of the body from a predetermined course.

4. In a steering mechanism for a movable body, a rudder, means including a pair of contact members one including a movable segmental contact and insulation between the segments of said contact, and the other including a contact arm cooperating with said segmental contact to control the motion of the rudder, a gyroscope for maintaining one of said members fixed in space, and means, adjustable at will, operatively interconnecting the other of said members with the rudder for regulating the rudder throw relatively to deviation of the body from a predetermined course.

5. In a steering mechanism for a movable body, a rudder, means including a pair of contact members, one including a movable segmental contact and insulation between the segments of said contact, and the other including a contact arm cooperating with said segmental contact to control the motion of the rudder, a gyroscope for maintaining the first named of said members fixed in space and means, adjustable will, operatively interconnecting the other of said members with the rudder for regulating the rudder throw relatively to deviation of the body from a predetermined course.

6. In a steering mechanism for a movable body, a rudder, means including a pair of contact members one including a movable segmental contact and insulation between the segments of said contact, and the other including a contact arm cooperating with said segmental contact to control the motion of the rudder, a stabilizer for maintaining one of said members fixed in space, and a ratio varying connection adjustable at will, operatively interconnecting the other of said members with the rudder for regulating the rudder throw relatively to deviation of the body from a predetermined course.

7. In a steering mechanism for a movable body, a rudder means including a pair of contact members, one including a movable segmental contact and insulation between the segments of said contact, and the other including a contact arm cooperating with said segmental contact to control the motion of the rudder, a gyroscope for maintaining the first named of said members fixed i space and a ratio varying connection a justable at will, operatively interconnectin the other of said members with the rudd for regulating the rudder throw relativel to deviation of the body from a predete mined course.

8. In a steering mechanism for a movab body, a rudder, means including a pair relatively movable members for controllin movement of said rudder, means for stab lizing one of said members, and a rod, a justable in length, interconnecting the oth of said members and said rudder.

9. In a steering mechanism for a movabl body, a rudder, means including a pair relatively movable members for controllin movement of said rudder, a gyroscope fc stabilizing one of said members, and a ro adjustable in length, interconnecting th other of said members and said rudder.

10. In a steering mechanism for a movabl body, a rudder, means including a pair contact members one including a movabl segmental contact and insulation betwee the segments of said contact, and the othe including a contact arm cooperating wit said segmental contact to control the motio of the rudder, a stabilizer for maintainin one of said members fixed in space, mean adjustable at will, operatively interconnec ing the other of said members with the rud der for regulating the rudder throw rela tively to deviation of the body from a pre determined course, and means for maintain ing said last named interconnecting mean in adjusted position.

11. In a steering mechanism for a movabl body, a rudder means including a pair o contact members, one including a movabl segmental contact and insulation betwee the segments of said contact, and the othe including a contact arm cooperating wit said segmental contact to control the motio of the rudder, a gyroscope for maintainin the first named of said members fixed ii space, a ratio varying connection adjustabl at will, operatively interconnecting the oth er of said members with the rudder for reg ulating the rudder throw relatively to de viation of the body from a predetermine course, and a clamp for locking said rati varying connection in adjusted position.

In testimony whereof I hereunto affix m signature.

ALBERT D. TRENOR.